US006213497B1

(12) United States Patent
Spencer et al.

(10) Patent No.: US 6,213,497 B1
(45) Date of Patent: Apr. 10, 2001

(54) INFLATABLE KNEE BOLSTER

(75) Inventors: Graham Thornton Spencer, Troy; James Kent Conlee, Dayton; John Charles Weber, Springboro, all of OH (US); James Lloyd Webber, Shelby Township, Macomb County, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/479,166

(22) Filed: Jan. 7, 2000

Related U.S. Application Data

(63) Continuation-in-part of application No. 09/130,939, filed on Aug. 7, 1998, now Pat. No. 6,032,978.

(51) Int. Cl.[7] .............................. B60R 21/22; B60R 21/04
(52) U.S. Cl. ........................................ 280/730.1; 280/753
(58) Field of Search ................................. 280/730.1, 753

(56) References Cited

U.S. PATENT DOCUMENTS

| | | | | |
|---|---|---|---|---|
| 4,198,075 | * | 4/1980 | Kob et al. .............................. | 280/753 |
| 5,312,131 | * | 5/1994 | Kitagawa et al. ................. | 280/730.2 |
| 5,324,070 | * | 6/1994 | Kitagawa et al. ................. | 280/730.1 |
| 5,382,051 | * | 1/1995 | Glance ................................ | 280/751 |
| 5,476,283 | * | 12/1995 | Elton .................................... | 280/753 |
| 5,536,043 | * | 7/1996 | Lang et al. .......................... | 280/753 |
| 5,570,901 | * | 11/1996 | Eyrainer ............................ | 280/730.1 |
| 5,615,914 | * | 4/1997 | Galbraith et al. ................. | 280/743.1 |
| 5,716,093 | * | 2/1998 | Sadr ................................... | 296/146.6 |
| 5,775,729 | * | 7/1998 | Schneider et al. ................. | 280/730.1 |
| 5,816,613 | * | 10/1998 | Specht et al. ........................ | 280/753 |
| 5,931,493 | * | 8/1999 | Sutherland ........................ | 280/730.1 |

FOREIGN PATENT DOCUMENTS

| 39 34 588 | * | 4/1991 | (DE) . |
|---|---|---|---|
| 19 54 143 | * | 6/1997 | (DE) . |

* cited by examiner

*Primary Examiner*—Kenneth R. Rice
(74) *Attorney, Agent, or Firm*—Kathryn A. Marra

(57) ABSTRACT

An inflatable knee bolster for a vehicle occupant is mounted in opposing relation to the knees of a vehicle occupant. The bolster is an expansible chamber of multipiece construction having a face portion and a separate three dimensional expansible body portion. The face portion and body portion are joined about their peripheries to define and substantially enclose the chamber. The expansible body portion is formed from injection molded polymeric material and has one or more integrally molded at least partially collapsible pleated profile elements disposed along the sides and across the top of the body portion in raised and lowered profile with respect to the face portion. Deformable mounting brackets extend outwardly from the body portion for attachment to the vehicle. The materials forming the face and body portions are of either similar or dissimilar chemical and physical character. Actuation of an inflator in fluid communication with the bolster pressurizes the expansible body causing at least a portion of the pleated profile elements to collapsibly deform such that the volume of the enclosed chamber is expanded and the face portion is thrust outwardly to an extended position.

20 Claims, 12 Drawing Sheets

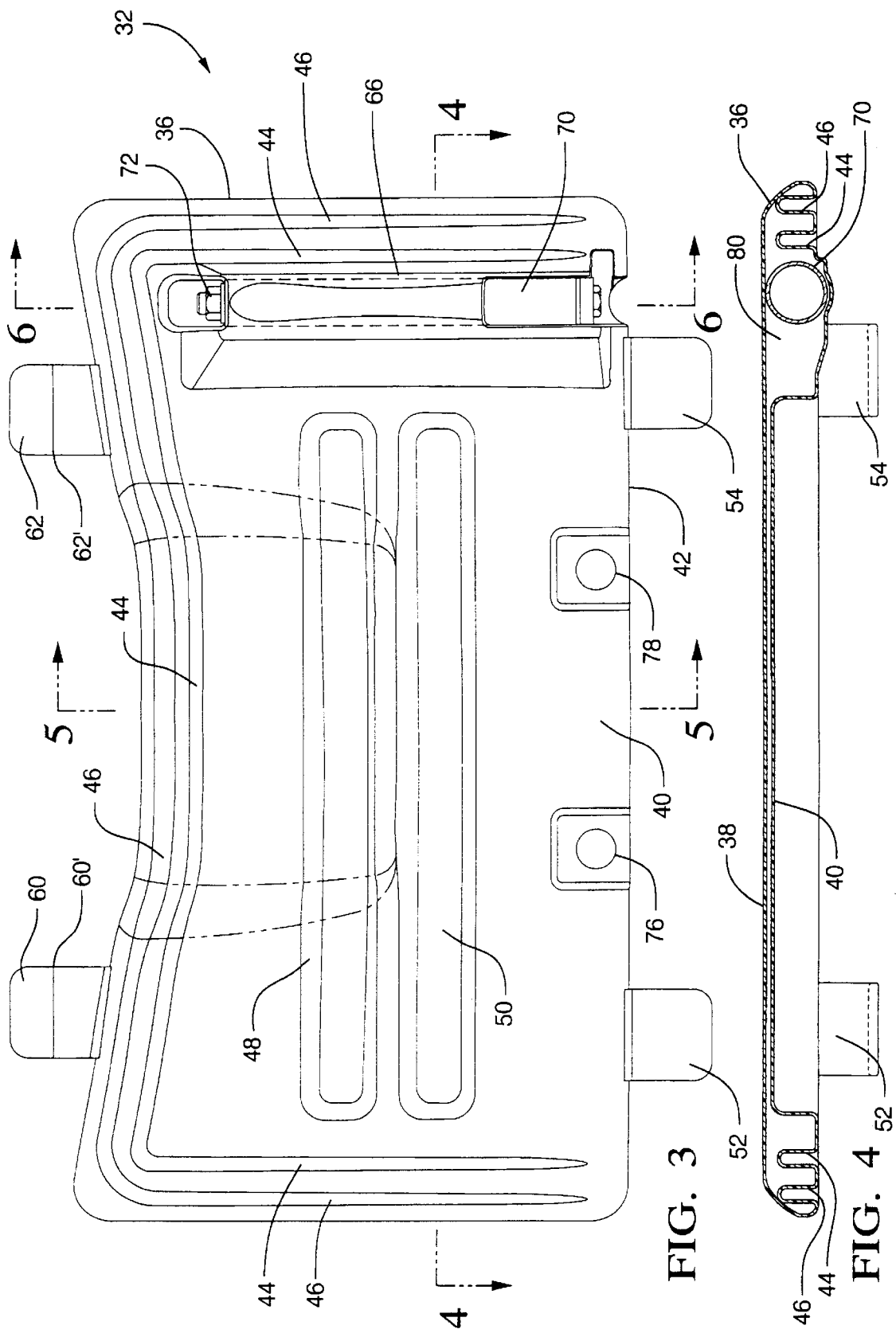

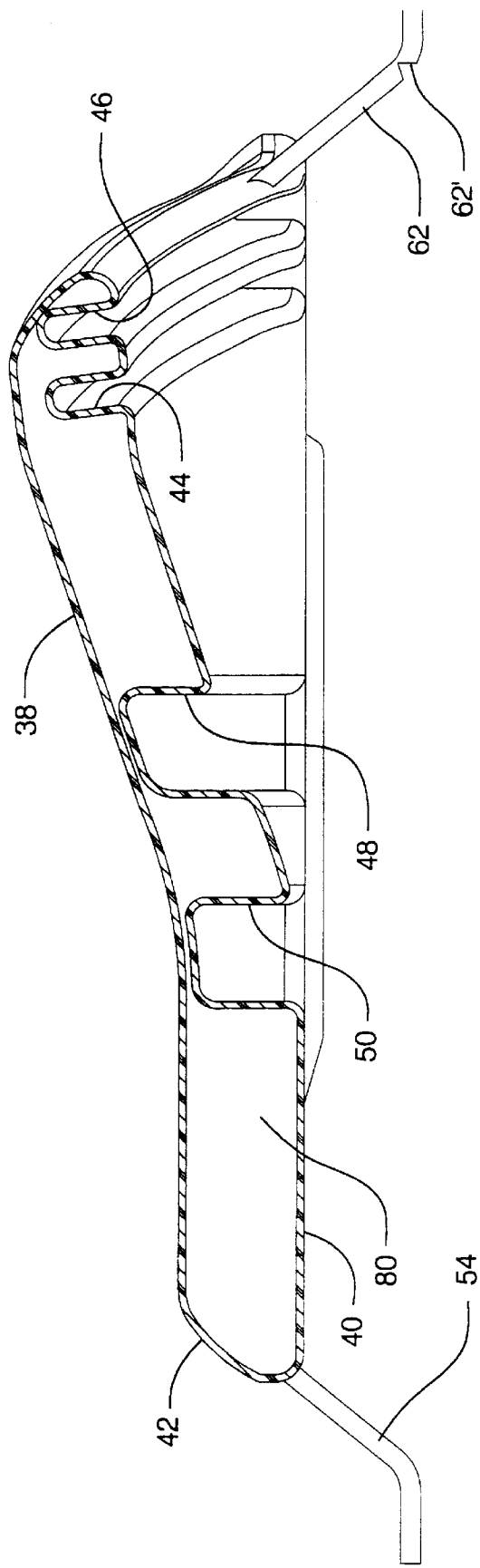
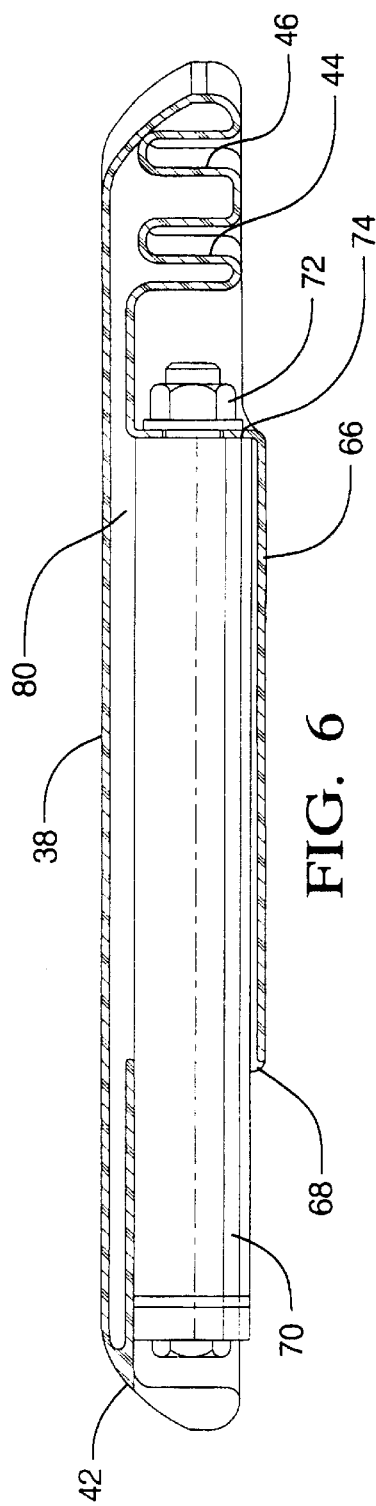
FIG. 5
FIG. 6

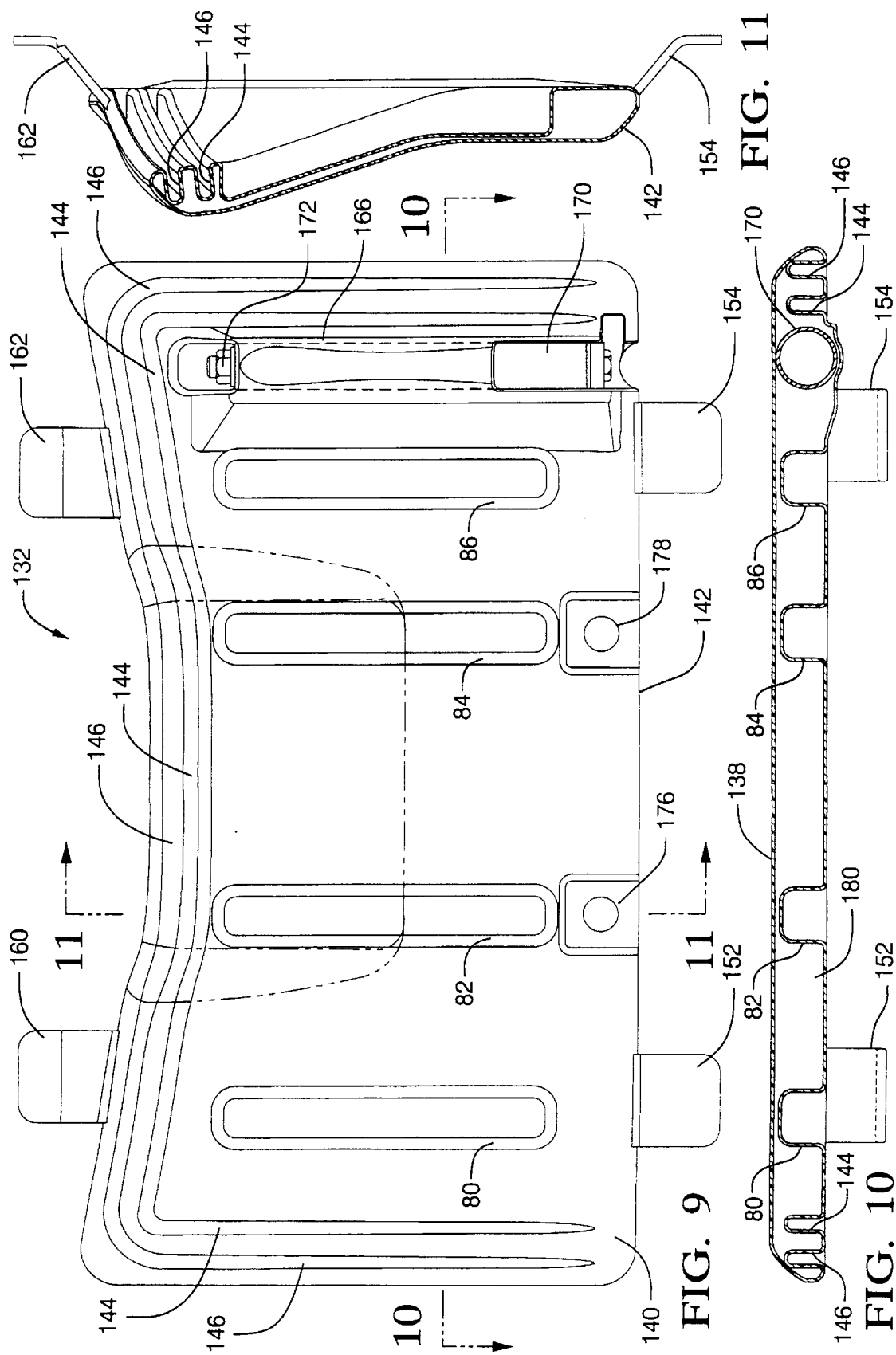

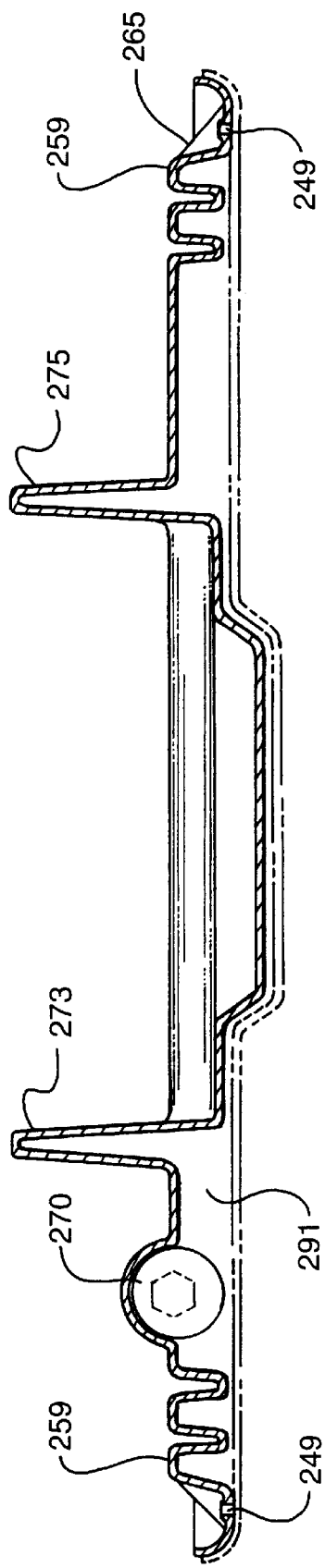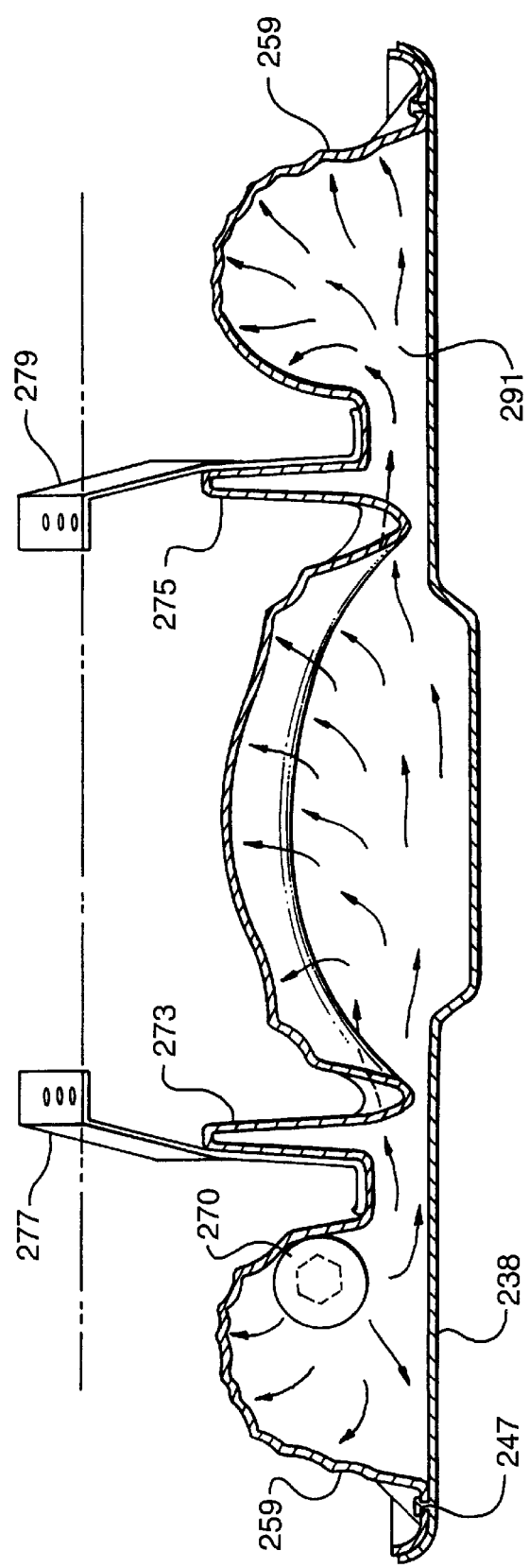
FIG. 18
FIG. 19

INFLATABLE KNEE BOLSTER

CROSS-REFERENCE TO RELATED APPLICATION

This application is a continuation-in-part of application Ser. No. 09/130,939 filed Aug. 7, 1998, now U.S. Pat. No. 6,032,978.

TECHNICAL FIELD

This invention is related generally to inflatable vehicle protective devices and, more particularly, to an inflatable knee bolster.

BACKGROUND OF THE INVENTION

Inflatable knee bolsters have been developed to enhance vehicle occupant protection in the event of sudden vehicle deceleration. Such devices increase the duration of deceleration of occupants' femurs and control upper torso kinematics during a frontal impact event. The bolster impact surface is moved from a stored position to an extended position to intercept an occupant's knees early in the impact event. This allows the knees more time to decelerate to the vehicle's final velocity. The initial positioning of the bolster impact surface in a retracted, stored position allows more styling flexibility and enhances occupant ingress and egress.

Typical inflatable knee bolster installations comprise an inflatable air bag sandwiched between an impact surface and a reaction surface. When the inflator is triggered, the air bag expands to move the impact surface a predetermined distance to active position. This position may be determined by tethers between the reaction and impact surfaces. These installations comprise numerous parts, bits and pieces and require careful installation.

It would be desirable to provide a simpler inflatable knee inflatable bolster which would be less costly to manufacture and assemble into the vehicle. To this end it is believed to be advantageous to utilize bolster configurations which utilize a relatively small number of components which may be easily assembled and which exhibit effective deployment in an operational situation.

SUMMARY OF THE INVENTION

It is an object of this invention to provide a simpler inflatable knee bolster which would be less costly to manufacture and assemble into the vehicle.

This invention provides advantages and alternatives over typical prior knee bolster installations by providing an inflatable knee bolster which may be deployed from a stored state to an operational state by expansion of the bolster body itself. Such configuration reduces and more preferably eliminates any reliance on the use of an air bag within the bolster structure thereby reducing the complexity of assembly and installation and effecting a reduction in the number of active components within the operating device.

In one aspect this invention features an inflatable bolster for a vehicle occupant having an outer wall that is projected outwardly from a stored position to an extended position by inflation of an expansible chamber by an inflator. The expansible chamber includes a unitary hollow body having an outer wall and an inner wall interconnected by U-shaped normally folded accordion pleats. An attachment tab extends from the top of the chamber for attachment to vehicle structure, and another attachment tab extends from the bottom of the chamber for attachment to vehicle structure. Alternatively, the bottom of the outer surface could be attached directly to vehicle structure.

In another aspect of this invention, the bolster is an inflatable knee bolster having an outer wall that is projected outwardly to an extended position adjacent the occupant's knees by inflation of an expansible chamber by an inflator. The outer and inner walls are interconnected at their bottoms by a bottom wall and at their tops and sides by the accordion pleats which are U-shaped and extend from the bottom side corners up the sides and across the top of the body. The top tab is a frangible tab which is broken by expansion of the expansible chamber, allowing the outer wall to pivot about the bottom wall and extend. Preferably, tethers on the frangible tab limit movement of the outer wall. Also, vent holes are preferably included to provide subsequent controlled deflation of the expansible body. The hollow body is preferably a blow molding of polypropylene.

According to another aspect of the present invention, an inflatable knee bolster of multipiece construction is provided. The bolster is formed of separate portions forming the face and an expansible body which are joined about their peripheries. Formed within the body portion are a plurality of at least partially collapsible profile elements extending in raised and lowered profile within the cavity between the face and the expansible body. At least a portion of the profile elements undergo collapsible deformation upon pressurization of the cavity by an inflator thereby expanding the volume of the cavity and forcing the face outwardly from a stored position to an extended position.

According to yet other potentially preferred aspects of the invention, the face portion and body portion of the bolster of multipiece construction are formed from injection molded polymeric materials. The materials forming the face portion and the body portion are preferably of different durometers such that the face portion is more rigid than the body portion. The materials forming the face and the body portions may be either of similar or dissimilar chemical composition.

According to yet further potentially preferred aspects of the present invention, the face portion and body portion of the bolster of multipiece construction are joined along their peripheries by mateable projectile and aperture elements with intermediate ridges therebetween. The projectile and aperture elements are preferably fusion bonded to effect melt flow of the projectile elements within the aperture elements between the ridges.

In accordance with other potentially preferred aspects of the present invention, the knee bolster includes mounting elements extending outwardly from the underside of the body portion facing away from the vehicle occupant for attachment to the vehicle frame. The mounting elements are preferably metal brackets which undergo flexure and subsequent plastic deformation upon impact by a vehicle occupant.

Advantageously, the knee bolster according to the present invention serves to provide a construction which is easily assembled and may be expanded to its operable position either with or without the use of an internally disposed air bag component. The orientation of expansion elements and the materials of construction may be selected to provide preferential expansion of designated regions of the bolster to enhance design alternatives.

Additional objects features and advantages of the invention will be set forth in part in the description which follows, and in part will be obvious from the description. While the invention is illustrated and will be described in connection with potentially preferred embodiments, it is to be understood that such illustration and description are exemplary and explanatory only and are in no way to be construed as restrictive of the invention. On the contrary, it is the intent of the applicants to cover all alternatives, modifications, and equivalents as may be included within the true spirit and scope of the invention as limited only by the full scope of allowable claims.

BRIEF DESCRIPTION OF THE DRAWINGS

The present invention will now be described, by way of example only, with reference to the accompanying drawings, in which:

FIG. 3 is a rear view of the inflatable knee bolster of FIG. 1;

FIG. 4 is a sectional view taken along line 4—4 of FIG. 3;

FIG. 5 is a sectional view taken along line 5—5 of FIG. 3;

FIG. 6 is a sectional view taken along line 6—6 of FIG. 3;

FIG. 9 is a rear view of another embodiment of inflatable knee bolster according to this invention;

FIG. 10 is a sectional view taken along line 10—10 of FIG. 9;

FIG. 11 is a sectional view taken along line 11—11 of FIG. 9;

FIG. 18 is a sectional view taken along line 18—18 of FIG. 14; and

FIG. 19 is a view similar to FIG. 18 illustrating the knee bolster of FIG. 12 in expansion.

DESCRIPTION OF PREFERRED EMBODIMENTS

Figure 1:
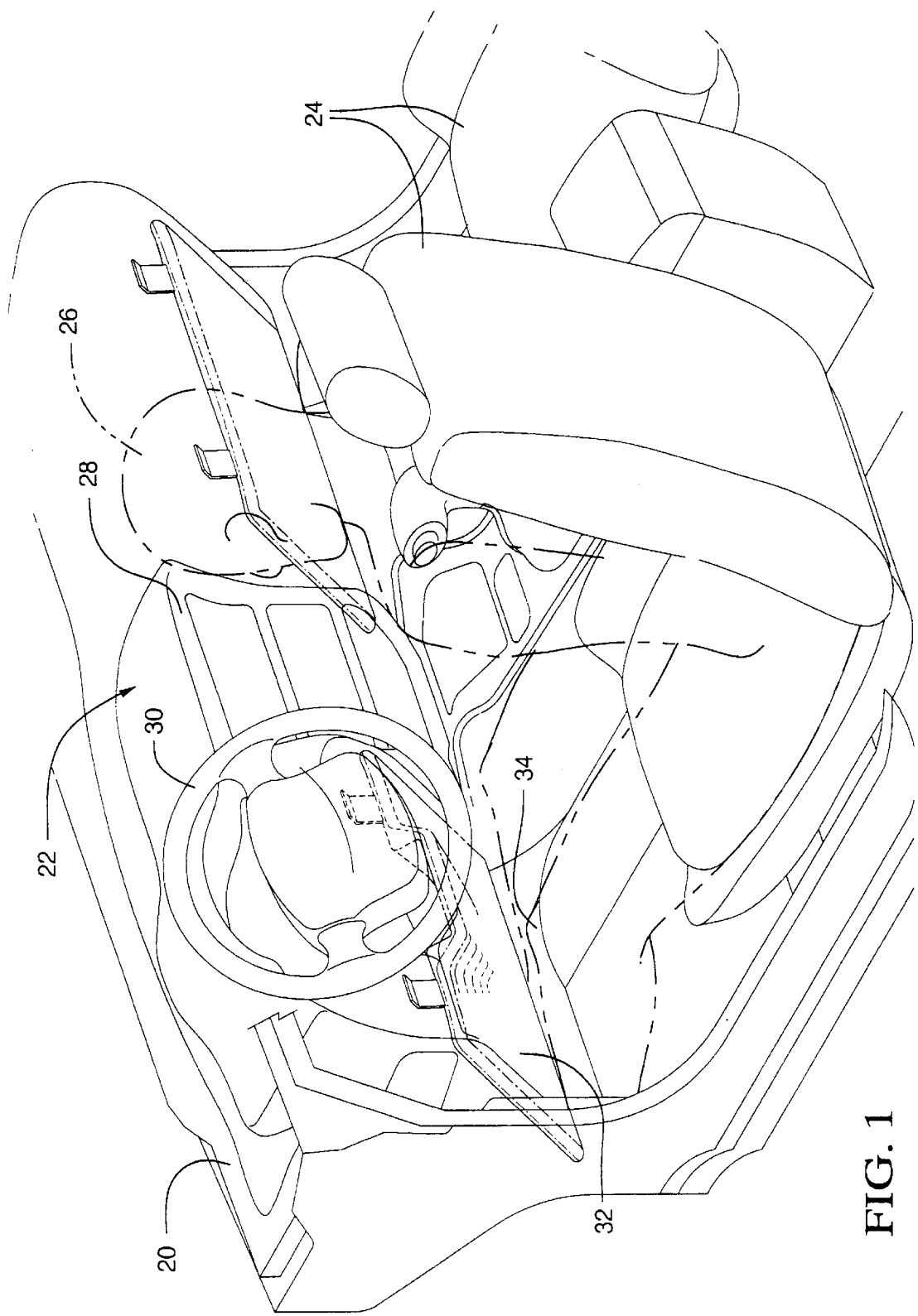
FIG. 1 is a perspective view of the driver's side of a vehicle passenger compartment showing the position of an inflatable knee bolster of this invention in stored position.
Figure 8:
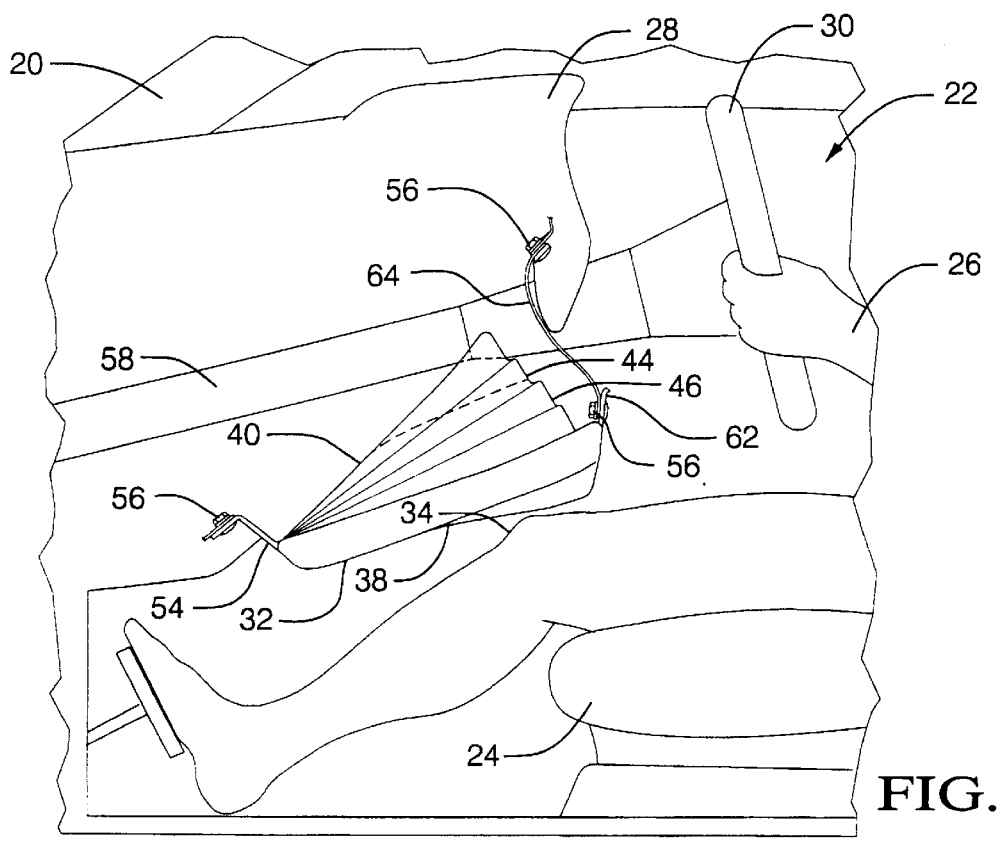
FIG. 8 is a view similar to FIG. 7, showing the inflatable knee bolster in extended position.

Referring to FIG. 1, an automotive vehicle 20 has a passenger compartment 22 that includes front seats 24 for the occupants, including a driver 26. The usual instrument panel 28 flanks the steering wheel 30. An inflatable knee bolster 32 is mounted on the underside of instrument panel 28 adjacent the knees 34 of driver 26. A similar arrangement is provided for the passenger. Knee bolster 34 is nearly flush with the underside of instrument panel 28, as best seen in FIG. 8.

Referring now to FIGS. 2–7, knee bolster 32 comprises a unitary hollow main body 36 formed of a blow molded polypropylene-based or other thermoplastic material. Main body 36 includes a front or outer wall 38 and a spaced inner wall 40 that are interconnected by a bottom wall 42. At their tops and sides, outer wall 38 and inner wall 40 are interconnected by inverted U-shaped accordion pleats 44 and 46 which are normally folded, as shown.

Figure 7:
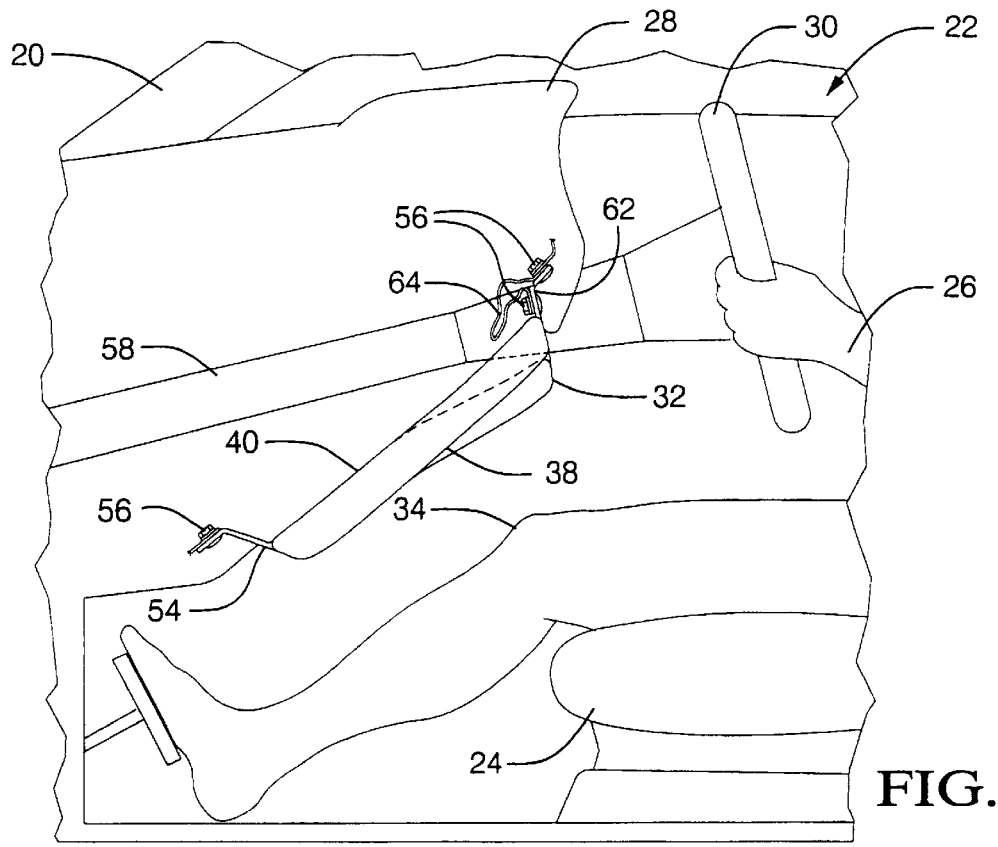
FIG. 7 is a partial side view of the passenger compartment of FIG. 1, showing the inflatable knee bolster in stored position.

A pair of transverse strengthening ribs 48 and 50 are formed in inner wall 40 and extend inwardly of body 36 into engagement with the rear side of outer wall 38, as best seen in FIG. 5. A pair of integral lower mounting tabs 52 and 54 extend from bottom wall 42 for attachment by screws 56 to the bottom 58 of instrument panel 28 as best seen in FIG. 7. A pair of integral upper frangible mounting tabs 60 and 62, having weakened sections 60' and 62', extend upwardly from body 36 for attachment to instrument panel bottom 58 by screws 56. A tether 64 is fastened by screws 56 to both ends of upper mounting tabs 60 and 62.

A cavity 66 is formed in inner wall 40 and includes an opening 68 for receiving a cylindrical inflator 70 that is bolted at 72 to the upper wall of cavity 66, as best shown in FIGS. 3 and 6. Inner wall 40 also includes a pair of spaced vent holes 76 and 78, as shown in FIG. 3. With this unitary construction, main body forms a hollow chamber 80 that is air tight except for vent holes 76 and 78.

In the event of vehicle deceleration during a frontal impact event, an acceleration sensor (not illustrated) actuates inflator 70, which pressurizes main body 36. This forces main body 36 to expand by breaking frangible tabs 60 and 62 at 60' and 62' and unfolding accordion pleats 44 and 46. This projects bolster outer wall 38 outwardly to the extended position shown in FIG. 8 adjacent occupant's knees 34. This movement to extended position is limited by the length of tethers 64. Thus, bolster outer wall 38 is in position to engage the occupant's knees 34 and lower leg to increase their duration of deceleration during vehicle deceleration.

An alternative embodiment of inflatable knee bolster, denoted 134, is shown in FIGS. 9–11, where parts similar or identical to parts in the FIGS. 1–8 embodiment are identified by like numbers increased by 100. Here, the main difference is the inclusion of four spaced vertical strengthening ribs 80, 82, 84 and 86 which are formed in inner wall 140. These replace ribs 48 and 50 in the FIGS. 1–8 embodiment and provide the same strengthening function. Functioning of this embodiment is the same.

Figure 12:
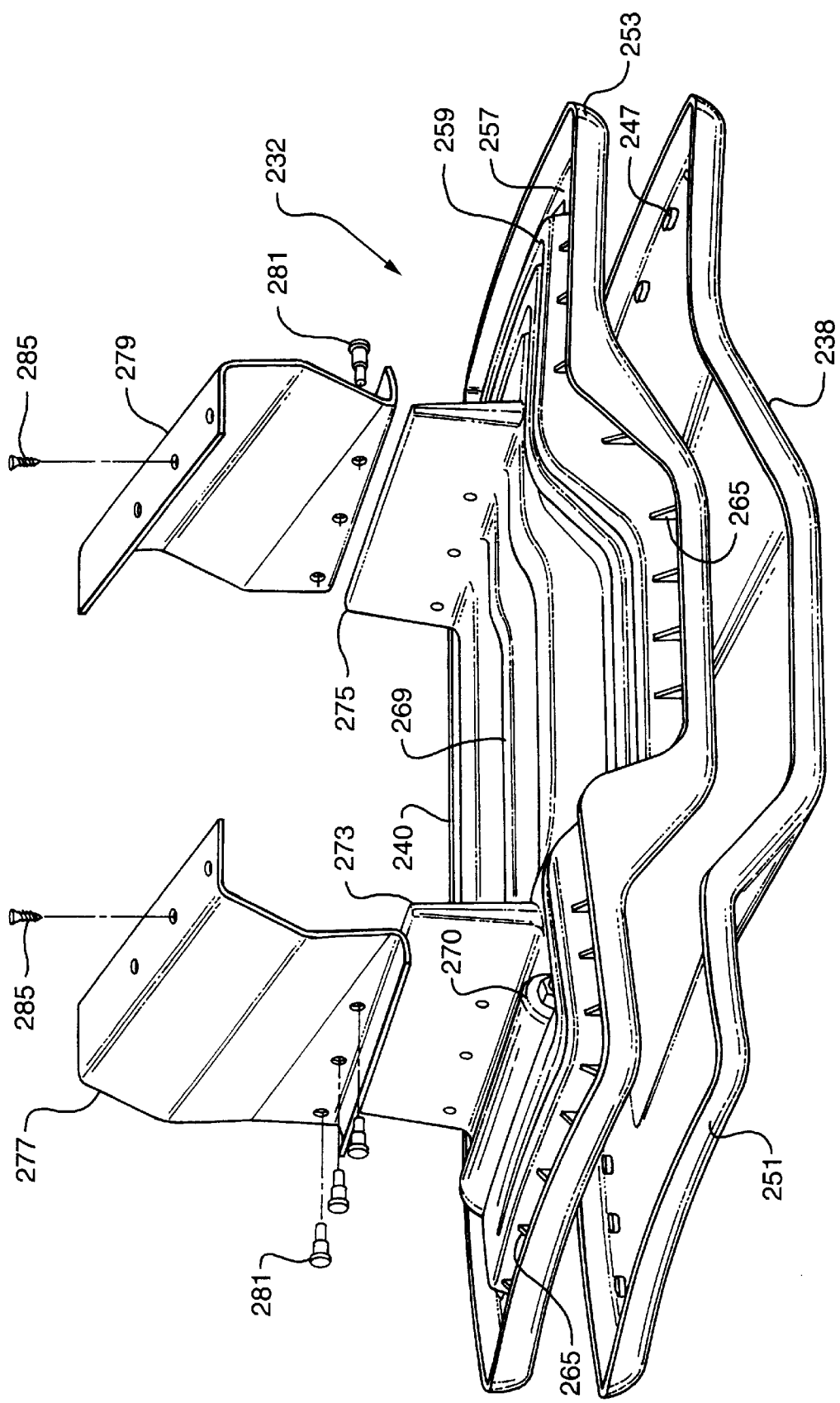
FIG. 12 is an exploded perspective view of a further embodiment of an inflatable knee bolster according to this invention comprising at least two discrete panel sections.

A further embodiment of an inflatable knee bolster 232 of multipiece construction is illustrated in FIG. 12 wherein the front wall 238 forming the face portion of the knee bolster 232 and a three dimensional expansible body portion 240 are formed as separate panels which are joined in sealed relation about their peripheries as will be described further herein.

Figure 13:
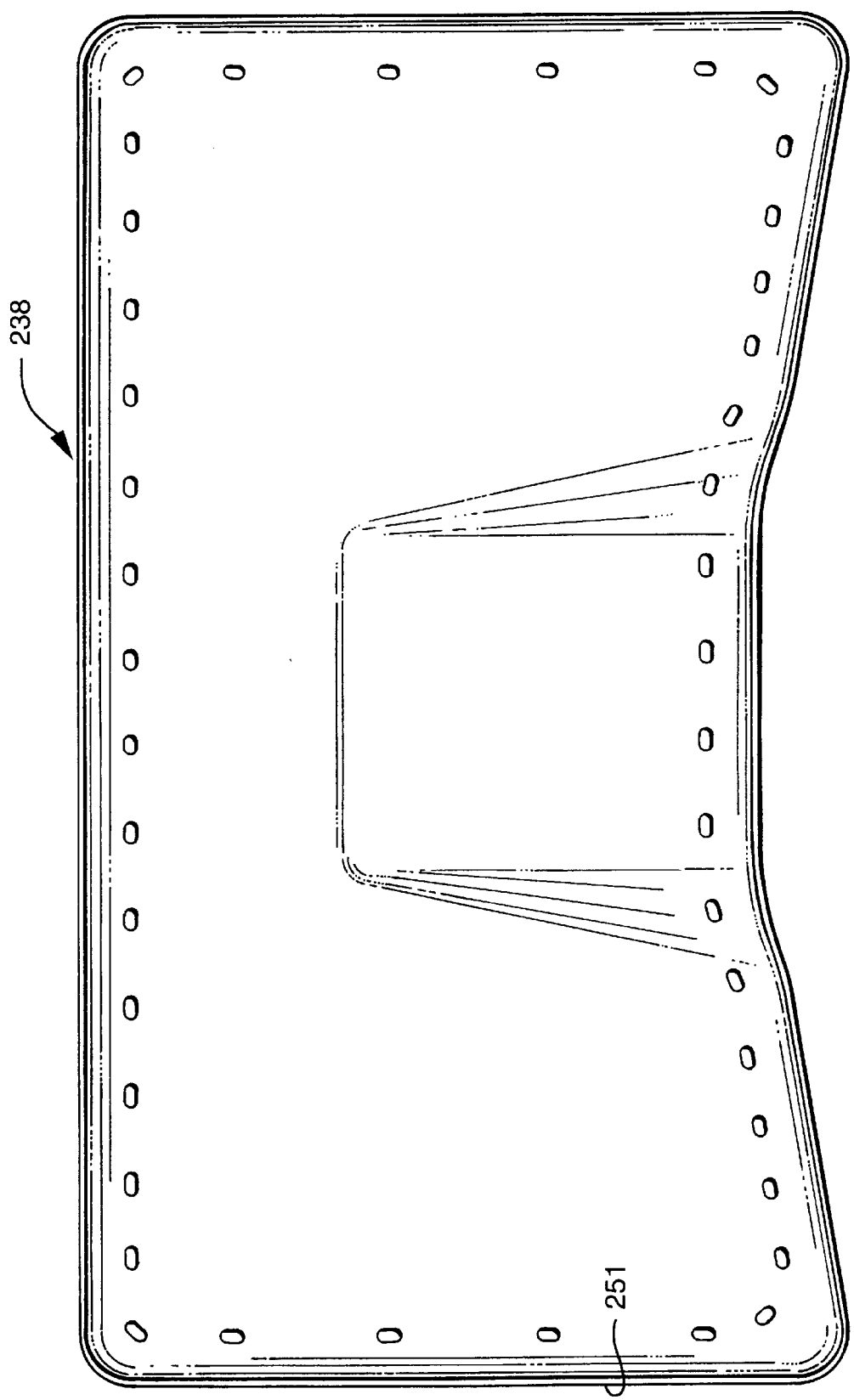
FIG. 13 is an interior view of the face-forming panel of the inflatable knee bolster illustrated in FIG. 12.
Figure 14:
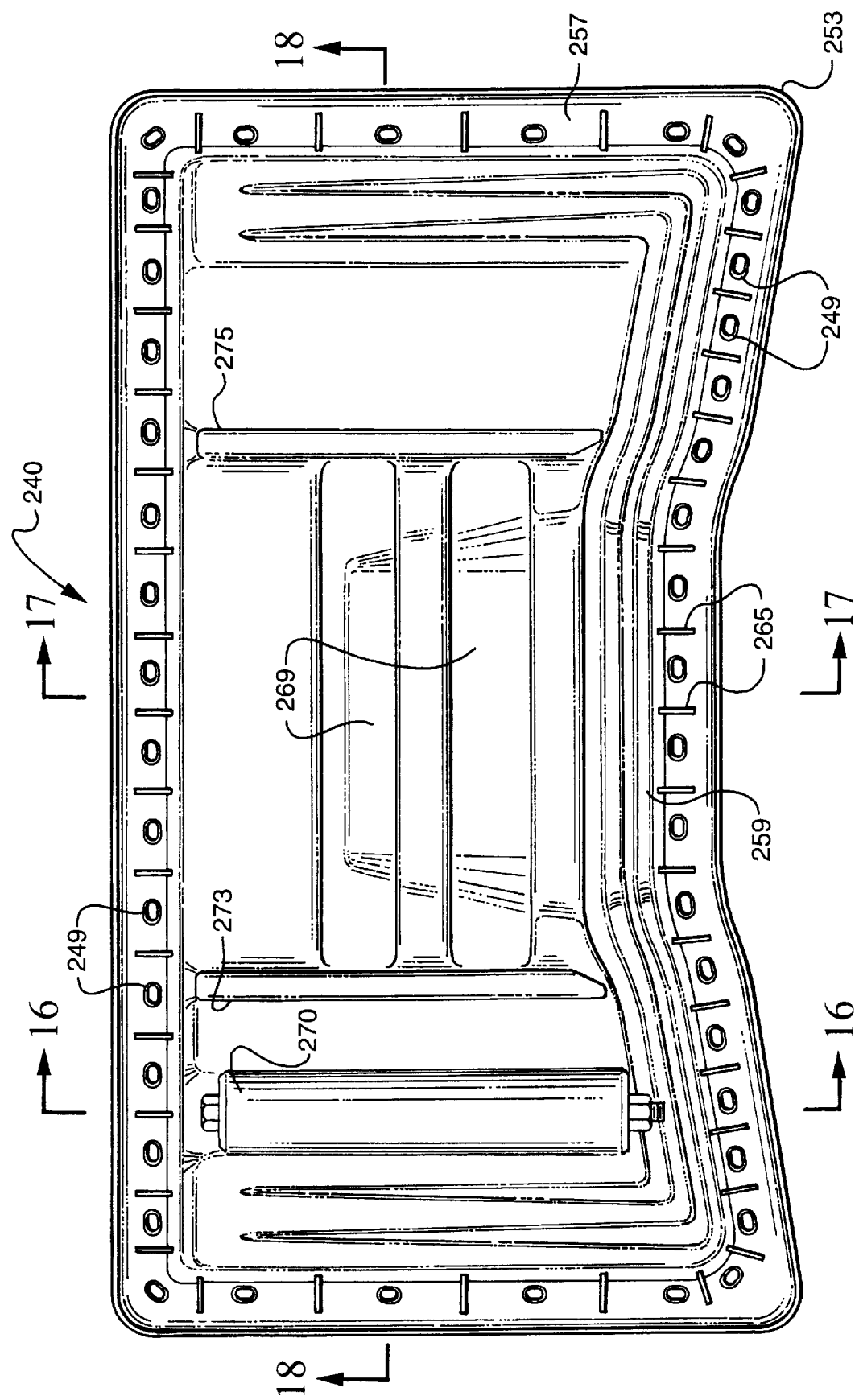
FIG. 14 is a plan view of the underside of the body portion of the inflatable knee bolster illustrated in FIG. 12.

The front wall 238 forming the face portion of the knee bolster preferably has a substantially smooth outer surface which may be contoured for disposition within the underside of the vehicle instrument panel. As shown in FIG. 13, the underside of the front wall 238 preferably includes a number of integrally molded male projectile elements 247 extending generally around the periphery of the underside for use in securing attachment to the panel forming the body portion 240. In the illustrated and potentially preferred embodiment, the projectile elements 247 are of a generally hollow ellipsoidal geometry having substantially straight sides connected by curved ends and are of a height sufficient for mateable insertion and upward extension through corresponding apertures 249 disposed around the periphery of the body portion 240 (FIG. 14).

Figure 15A:
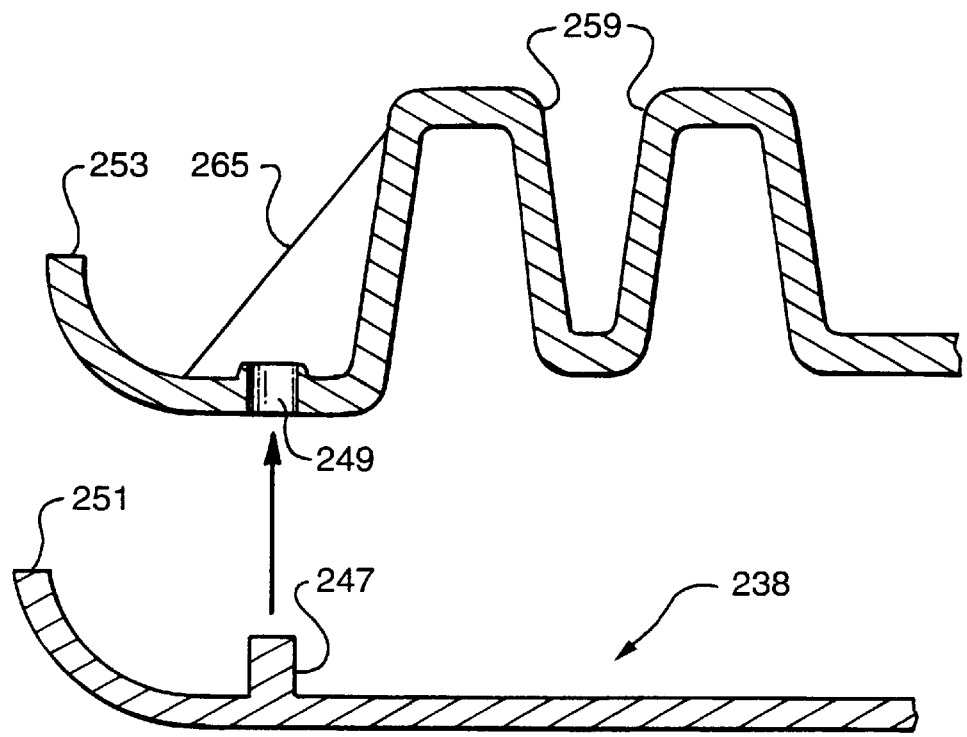
FIGS. 15A and 15B illustrate a potential arrangement for attachment of the panel elements illustrated in FIG. 12.
Figure 15B:
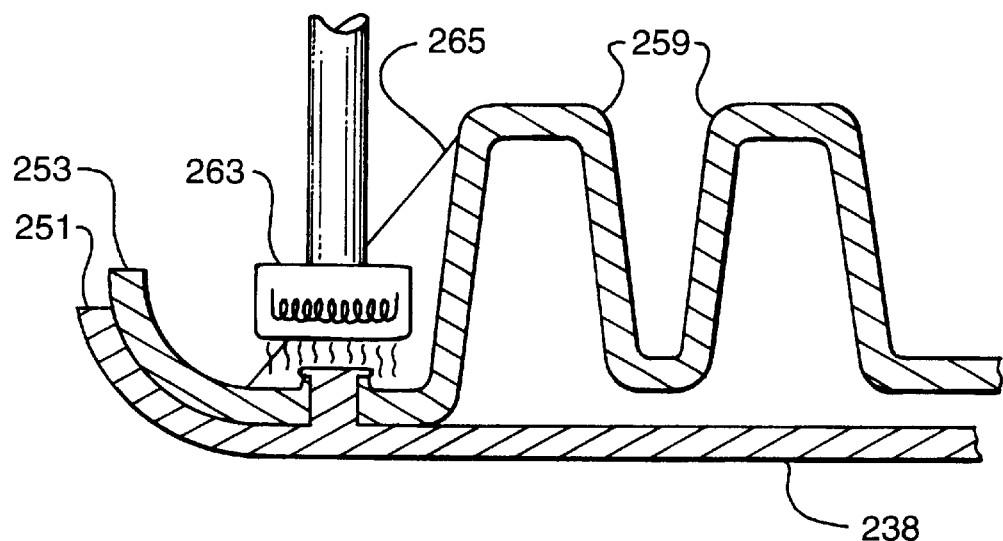

As best illustrated in FIG. 12, the front wall 238 forming the face portion of the knee bolster 232 is preferably of unitary construction having a raised perimeter edge 251 surrounding the interior surface thereby forming a tray-like structure. As illustrated, the body portion 240 preferably includes a perimeter wall 253 which is mateable in nesting relation within the perimeter edge 251 of the front wall 238 such that male projectile elements 247 extend upwardly through the corresponding apertures 249 which are disposed within a channel 257 between the perimeter wall 253 and adjacent expandable perimeter profile elements 259 which are preferably of a raised and lowered accordion configuration. This mating relationship is best illustrated in FIGS. 15A and 15B.

The projectile elements 247 may be held in place within the apertures 249 by joining techniques as are known to those of skill in the art including by way of example only and not limitation, sonic welding, vibration welding, laser welding, thermal melt bonding, adhesive bonding and combinations thereof. One potentially preferred method of attachment involves use of a moveable sonic welder 263 (FIG. 15B) operating a frequency of about 20 MHz.

According to the illustrated embodiment, rib-like ridges 265 of substantially right triangular configuration are disposed inboard of the perimeter wall 253 of the body portion 240 between the apertures 249. Such ridges 265 may serve as weirs for the containment of melt material which flows outwardly from the projectile containing apertures during the melt bonding operation and in some configurations may provide additional support if desired.

Although the mateable bonding of projectile elements 247 within corresponding apertures 249 may represent one mechanism for the joinder of the discrete portions of the knee bolster 232, it will be appreciated that a host of other mechanisms may likewise be utilized either independently or in combination which do not rely upon such geometries. Such attachment mechanisms include by way of example only, direct mechanical attachment, smooth service welding or chemical adhesion.

In the illustrated embodiment, the body portion 240 comprises a unitary panel which extends away from the front wall facing generally away from the vehicle occupant and towards the engine compartment. While panels of unitary molded construction may be preferred, it is to be understood that the panels forming the body portion 240 as well as the front wall 238 may likewise be formed from two or more pieces which are later joined together.

Figure 16:
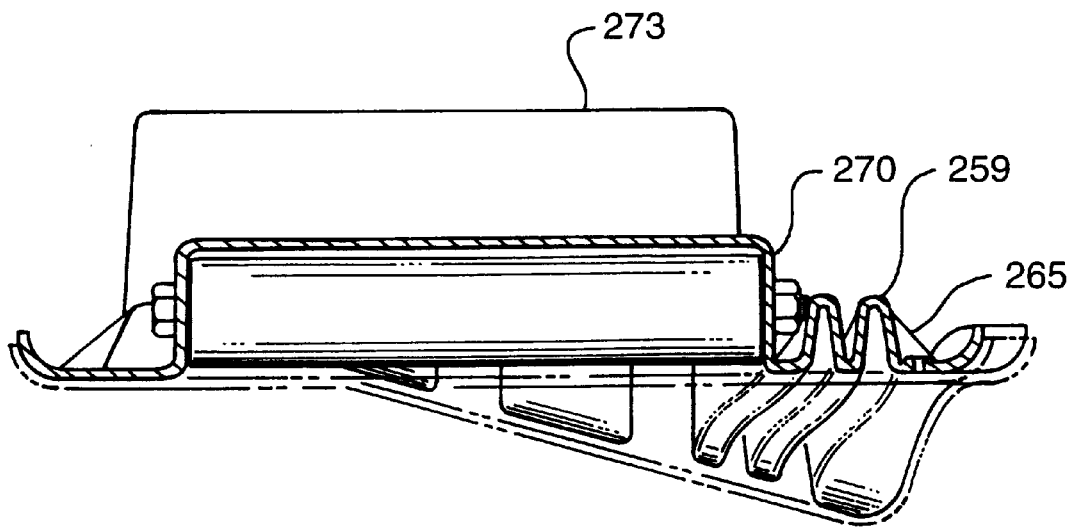
FIG. 16 is a sectional view taken along line 16—16 of FIG. 14.
Figure 17:
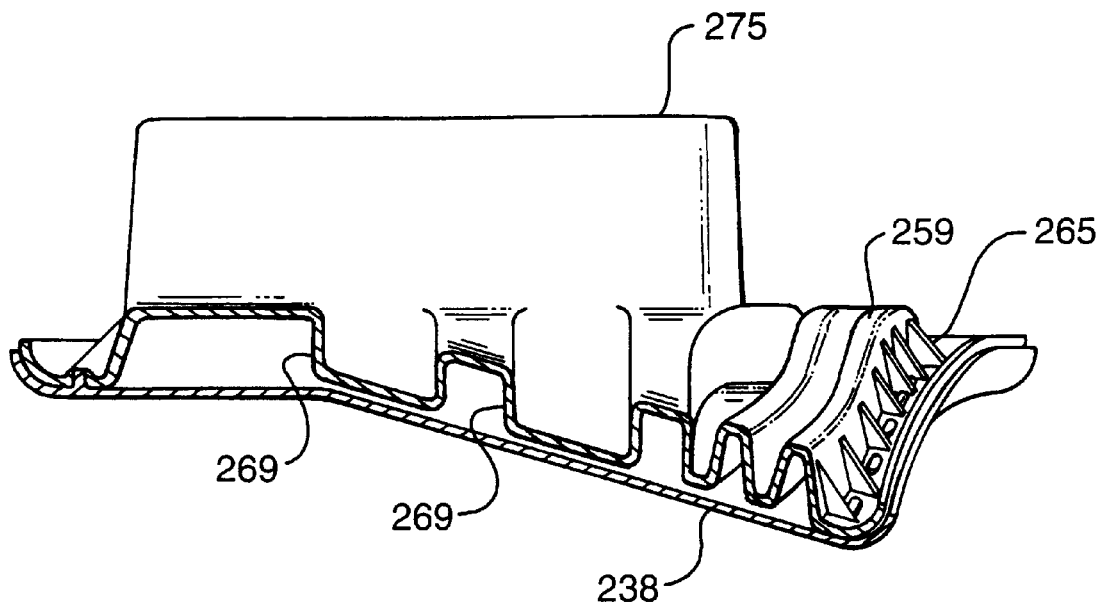
FIG. 17 is a sectional view taken along line 17—17 of FIG. 14.

As previously referenced, and best illustrated in FIGS. 16–18, the underside of the body portion 240 preferably includes one or more integrally formed perimeter profile elements 259 extending in raised and lowered relief with respect to the front wall 238 inboard of and substantially adjacent to the line of attachment between the front wall 238 and the body portion 240. As shown, the perimeter profile elements 259 are preferably arranged in a wave form accordion orientation and occupy a relatively wide band extending along the top edge of the body portion 240. These perimeter profile elements 259 preferably taper away as they extend down the lateral sides of the body portion 240. In addition, in the illustrated and potentially preferred embodiment, interior rib profile elements 269 extend from the back of the body portion 240 towards the front wall 238.

The underside of the body portion 240 preferably includes an integral molded chamber for housing an inflator 270 as illustrated. However, as will be appreciated, the inflator 270 may likewise be housed in a location remote from the knee bolster 232 and be connected thereto by tubing or other fluid communication means.

According to the illustrated embodiment, raised attachment surfaces 273, 275 of elongated tapered profile preferably extend outwardly from the underside of the body portion 240 for attachment to brackets 277, 279 by retaining pins 281 (FIG. 12). The brackets 277, 279 are preferably of an inwardly angled profile and are formed of a material such as light gauge steel of about 2 mm thickness or like material to facilitate energy absorptive flexure followed by plastic deformation upon impact. As will be appreciated, such brackets 277, 279 may be mounted in supported relation to the vehicle frame by screws 285 or other attachment devices as may be known to those of skill in the art.

In the event of a collision event which does not give rise to deceleration values sufficient to activate the inflator 270, it is believed that in some applications the brackets 277, 279 may nonetheless provide a degree of energy absorption through flexure and subsequent plastic deformation upon impact by an occupant. Bracket structures formed from plastically deformable material such as metal and having geometries which facilitate controlled bending under compression may be preferred for some applications.

Referring now to FIGS. 18 and 19, upon the occurrence of an impact event causing sufficient vehicle deceleration, the inflator 270 is actuated and releases a pressurizing medium which flows into the chamber 291 created by the enclosure between the face forming front wall 238 and the body portion 240. Upon pressurization of the interior, both the perimeter profile elements 259 and the interior rib profile elements 269 preferably undergo at least a partial collapse thereby increasing the volume of the chamber and placing the underside of the body portion into compression as the profile elements 259, 269 seek a flattened profile as they are pushed away from the front wall 238. Since the body portion 240 is held substantially rigidly in place in relation to the vehicle frame, the compressive stress is relieved by thrusting the front wall 238 outwardly to an operational position adjacent to the knees of the occupant.

Figure 2:
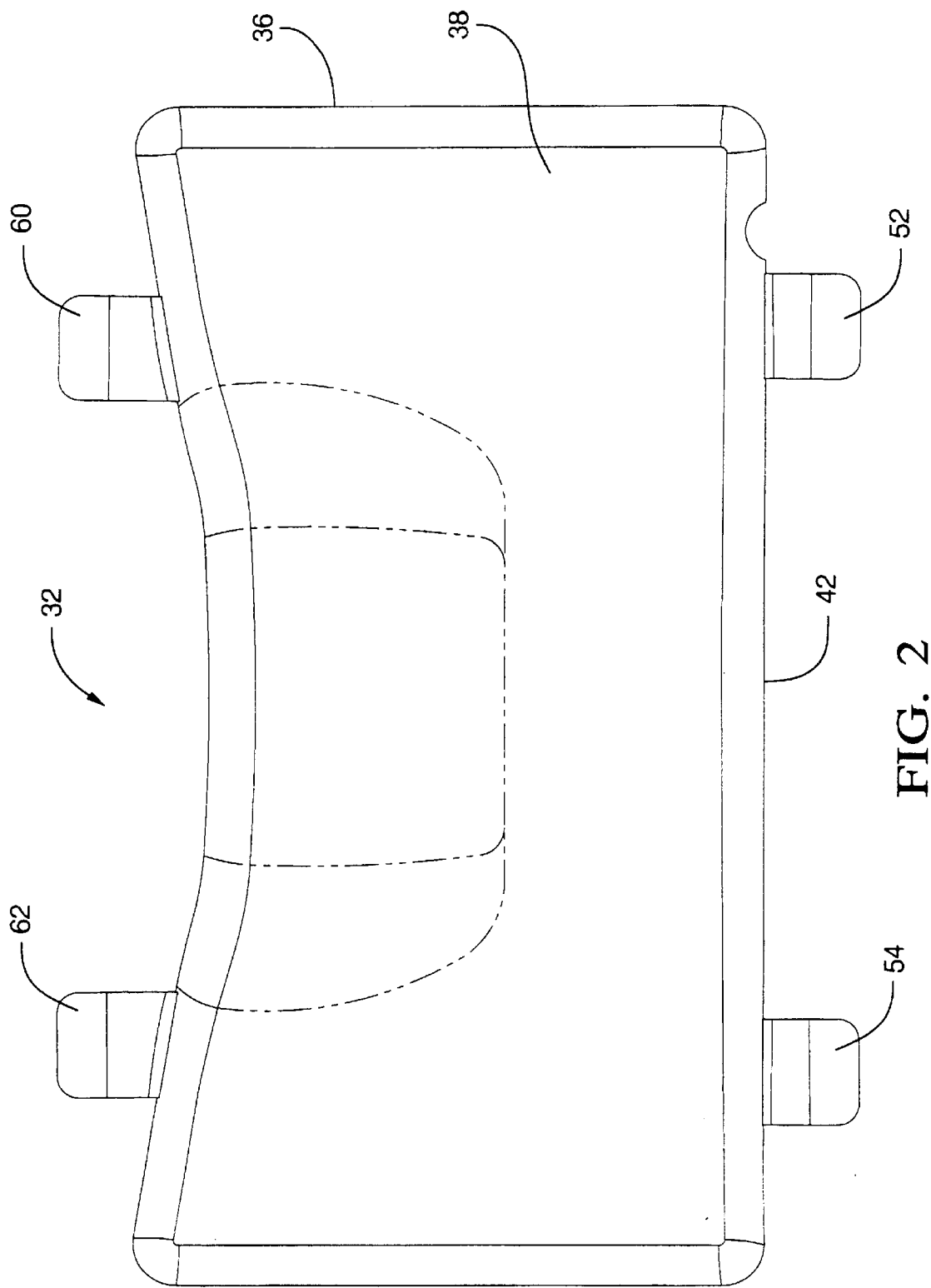
FIG. 2 is a front view of the inflatable knee bolster illustrated in FIG. 1.

As will be appreciated, the degree to which the front wall 238 is outwardly thrust will depend largely upon the surface area of the profile elements which undergo deformation. The preferential concentration of perimeter profile elements 259 extending along the upper edge of the knee bolster 232 will tend to provide preferential rotatable extension of the bolster at that region, while the interior rib profile elements 26 tend to distend the front wall as a whole. The orientation and concentration of such elements may thus be adjusted to facilitate characteristics of extension as may be desired for a given application. It is, of course to be understood that breakaway tethered attachment constructions including those as illustrated in FIGS. 2, 7 and 8 may also be utilized if desired.

In order to facilitate preferential pressurized expansion of the body portion 240, in some applications it may be desirable that the materials forming the front wall 238 and body portion 240 are such that the face portion is more rigid than the body portion and is therefore less likely to undergo deformation. Such differential rigidity may be achieved by adjusting the thickness of the components or by using polymers of differing durometer for the front wall and body portions. Potentially preferred materials for forming both the front wall and the body portion of the knee bolster are injection molded polymers, including by way of example only, polypropylenes, polycarbonates, polyurethanes and other suitable thermoplastic materials.

It is believed that injection molding of the panels forming the front wall 238 and the body portion 240 may permit the achievement of extremely close tolerances which may be desirable for some applications. Other molding techniques as may be known to those of skill in the art including by way of example only, compression molding, extrusion and the like may also be utilized.

It is contemplated that the materials forming the front wall 238 and body portion 240 may be either of similar or dissimilar chemical composition. According to one embodiment, the front wall 238 is formed from an injection molded polycarbonate thermoplast of high rigidity and impact strength while the body portion 240 is formed from a flexible injection molded polyurethane rubber. The use of materials of such differential rigidity tends to facilitate the preferential expansion of the body portion 240, while permitting the front wall to be substantially unaltered. Such performance characteristics may be desirable in certain applications.

While the present invention has been described as carried out in specific embodiments thereof, it is not intended to be limited thereby, but is intended to cover the invention broadly within the scope and spirit of the appended claims.

What is claimed is:

1. An expansible knee bolster for a vehicle occupant that is projected outwardly from a stored position to an extended position adjacent the occupant's knees by inflation of an expansible chamber by an inflator during a collision event, said knee bolster comprising:
    a hollow enclosure of multipiece construction having a face portion and a separate three dimensional expansible body portion joined to said face portion about the periphery of said face portion such that an expansible chamber is formed between said face portion and said body portion;
    said expansible body portion having a plurality of at least partially collapsible raised profile elements formed within said expansible body portion and extending towards said face portion such that upon pressurization of said expansible chamber by said inflator, at least a portion of said profile elements undergo collapsible deformation thereby expanding the volume of said chamber and forcing said face portion outwardly to an extended position.

2. The expansible knee bolster of claim 1, wherein said expansible body portion includes an integral receptacle for housing said inflator.

3. The expansible knee bolster of claim 1, wherein said expansible body portion is a one piece structure.

4. The expansible knee bolster of claim 1, wherein said face portion and said expansible body portion are formed from injection molded polymeric materials.

5. The expansible knee bolster of claim 4, wherein said face portion and said expansible body portion are formed from polymeric materials of differing durometers.

6. The expansible knee bolster of claim 4, wherein the polymeric material forming said face portion has a chemical structure which differs from the polymeric material forming said expansible body portion.

7. The expansible knee bolster of claim 1, wherein the material forming said face portion is more rigid than the material forming said expansible body portion.

8. The expansible knee bolster of claim 1, wherein said face portion is joined to said body portion by attachment means selected from the group consisting of: sonic welding; vibration welding; adhesive bonding; mechanical connection; and combinations thereof.

9. The expansible knee bolster of claim 1, wherein said face portion includes a plurality of projectile elements extending at least partially around the periphery of said face portion, said projectile elements being engageably mateable to corresponding apertures disposed at least partially around the periphery of said expansible body portion.

10. The expansible knee bolster of claim 9, further comprising raised elements disposed between adjacent apertures around the periphery of said expansible body portion.

11. The expansible knee bolster of claim 9, wherein said face portion is joined to said expansible body portion by controlled welding of said projectile elements within said corresponding apertures.

12. The expansible knee bolster of claim 1, further comprising mounting elements extending outwardly from said expansible body portion for attachment to the vehicle.

13. The expansible knee bolster of claim 12, wherein said mounting elements comprise deformable brackets.

14. The expansible knee bolster of claim 13, wherein said brackets are formed from metal.

15. An expansible knee bolster for a vehicle occupant that is projected outwardly from a stored position to an extended position adjacent the occupant's knees by inflation of an expansible chamber by an inflator during a collision event, said knee bolster comprising:

a hollow enclosure of multipiece construction having a face portion and a separate three dimensional expansible body portion joined to said face portion about the periphery of said face portion such that an expansible chamber is formed between said face portion and said body portion;

said expansible body portion being formed from injection molded polymeric material and having one or more integrally molded at least partially collapsible pleated profile elements disposed along the sides and across the top of said expansible body portion, such that upon pressurization of said expansible chamber by said inflator, at least a portion of said profile elements undergo collapsible deformation thereby expanding the volume of said chamber and forcing said face portion outwardly to an extended position.

16. The expansible knee bolster of claim 15, wherein said expansible body portion further includes one or more deformable ribs disposed across the interior of said expansible body portion.

17. The expansible knee bolster of claim 15, wherein said face portion and said body portion are formed from polymeric materials of differing durometer such that said face portion is more rigid than said expansible body portion.

18. The expansible knee bolster of claim 15, further comprising mounting brackets extending outwardly from said expansible body portion for attachment to the vehicle.

19. The expansible knee bolster of claim 18, wherein said mounting brackets are deformable during an impact event.

20. An expansible knee bolster for a vehicle occupant that is projected outwardly from a stored position to an extended position adjacent the occupant's knees by inflation of an expansible chamber by an inflator during a collision event, said knee bolster comprising:

a hollow enclosure of multipiece construction having a face portion including a peripheral edge, a separate three dimensional expansible body portion joined to said face portion about said peripheral edge of said face portion such that an expansible chamber is formed between said face portion and said body portion and deformable mounting brackets extending outwardly from said expansible body portion for attachment to the vehicle;

said expansible body portion including a receptacle for housing said inflator and being formed from injection molded polymeric material of lower rigidity than said face portion and having one or more integrally molded at least partially collapsible pleated profile elements disposed along the sides and across the top of said expansible body portion in raised and lowered profile with respect to said face portion, and one or more deformable ribs disposed across the interior of said expansible body portion such that upon pressurization of said expansible chamber by said inflator, at least a portion of said profile elements undergo collapsible deformation thereby expanding the volume of said chamber and forcing said face portion outwardly to an extended position.

* * * * *